United States Patent [19]
Anderson

[11] 3,868,775
[45] Mar. 4, 1975

[54] SHOVEL MOUNTED WEED CUTTER

[75] Inventor: Robert L. Anderson, Great Falls, Mont.

[73] Assignee: James R. Paul, Great Falls, Mont. ; a part interest

[22] Filed: Aug. 13, 1973

[21] Appl. No.: 387,654

[52] U.S. Cl.................... 30/329, 7/14.55, 172/375, 294/49, 294/51, 294/59
[51] Int. Cl...... A01b 1/02, A01b 1/22, A01d 11/00
[58] Field of Search............ 30/296 R, 296 A, 329; 7/14.55, 1 L; 294/49, 59, 51; 254/132; 172/371, 375

[56] References Cited
UNITED STATES PATENTS

| | | | |
|---|---|---|---|
| 457,271 | 8/1891 | Hall | 294/51 |
| 467,971 | 2/1892 | Hammer | 294/49 |
| 1,124,046 | 1/1915 | Lopez et al. | 7/14.55 |
| 1,278,680 | 9/1918 | Klaffert | 7/14.55 |
| 1,307,328 | 6/1919 | Van Valkenburg | 294/59 X |
| 1,730,759 | 10/1929 | Crane | 7/14.4 |
| 3,077,230 | 2/1963 | Guenon | 294/59 X |
| 3,623,556 | 11/1971 | Adams | 172/375 X |
| 3,797,581 | 3/1974 | Holloway | 172/375 |

FOREIGN PATENTS OR APPLICATIONS

| | | | |
|---|---|---|---|
| 330,961 | 6/1930 | Great Britain | 294/49 |
| 850,575 | 9/1939 | France | 294/59 |

Primary Examiner—Al Lawrence Smith
Assistant Examiner—J. T. Zatarga
Attorney, Agent, or Firm—Clarence A. O'Brien; Harvey B. Jacobson

[57] ABSTRACT

A weed cutter attachment for a round headed shovel blade has a body member in the form of a bowed plate provided with a bifurcated cutting surface on an edge of the plate. Each bifurcated part of the cutting surface is arcuate in plan, and cooperatively meets with the other part to form a substantially V-shaped recess. Clamps are arranged on a concave surface of the plate for selectively, retentively engaging a shovel blade and clamping the attachment onto the blade.

6 Claims, 3 Drawing Figures

PATENTED MAR 4 1975   3,868,775

SHOVEL MOUNTED WEED CUTTER

BACKGROUND OF THE INVENTION

1. Field of the Invention

This invention relates generally to a cutting tool and specifically to a weed cutting attachment for a shovel.

2. Description of the Prior Art

U.S. Pat. Nos. 467,971, issued Feb. 2, 1892 to T. F. Hammer, and 876,793, issued Jan. 14, 1908 to A. Fossel, respectively disclose digging and tamping devices that are selectively attachable to a shovel blade, and the like. Further, U.S. Pat. Nos. 249,665, issued Nov. 15, 1881 to R. T. Pettebone, and 3,623,556, issued Nov. 30, 1971 to M. E. Adams, show cutting tools attachable directly to a handle shank, and the like.

An advantage of cutting tools as disclosed in the latter two patents mentioned above is that they permit one to cut close to a fence or building structure, and also facilitate the cutting of thick, large size weeds. These operations are almost impossible to perform with conventional lawn mowers, whip-cutters, and scythes.

SUMMARY OF THE INVENTION

It is an object of the present invention to provide a cutting tool that is selectively attachable to a shovel blade, and the like.

It is another object of the present invention to provide a weed cutter attachment for a round-headed shovel blade.

These and other objects are achieved according to the present invention by providing a shovel-mountable cutter tool having: a body member; a blade provided on the body member and arranged for cutting weeds, and the like; and clamps mounted on the body member for attaching same to a round-headed shovel blade, and the like.

Advantageously, the body member is a bowed plate having spaced concave and convex surfaces. The bowing of the plate is preferably such that it will conform to the usual contour of an associated shovel blade. In this manner, clamps mounted on the concave surface of the plate can be arranged over a peripheral portion of the shovel blade for clamping the plate to the shovel blade.

An advantageous feature of a cutting tool according to the present invention is the provision of a bifurcated cutting surface forming the blade. This cutting surface is advantageously arranged on an edge of the plate, and each bifurcated part of the cutting surface is arcuate in plan and cooperatively meets with the other part to form a substantially V-shaped recess.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
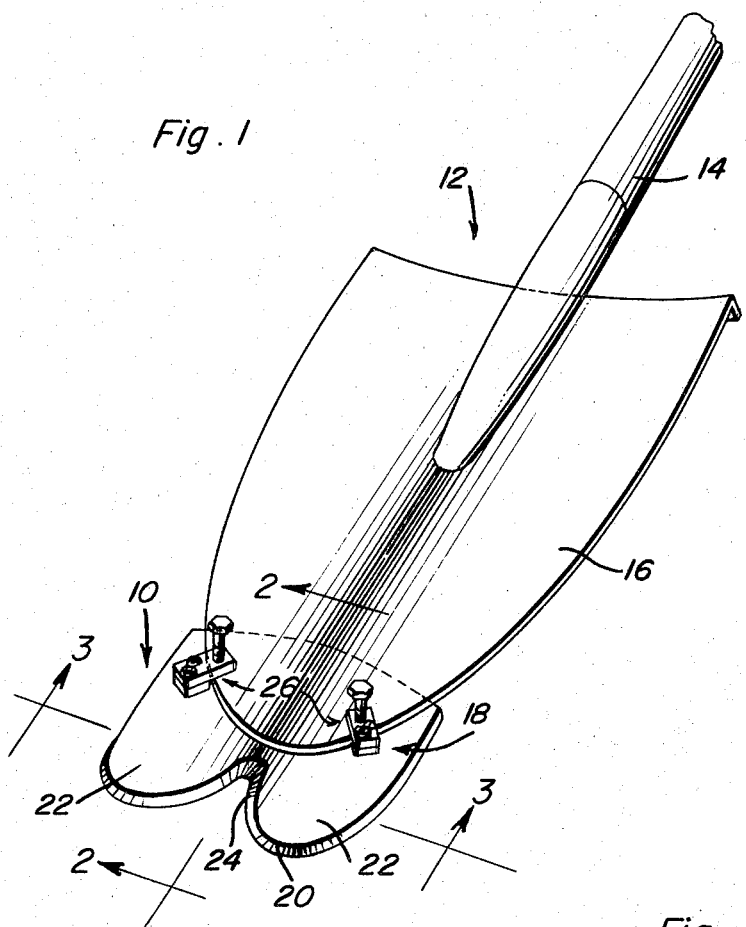
FIG. 1 is a fragmentary, perspective view showing a cutting tool attachment according to the present invention mounted on a shovel blade.
Figure 2:
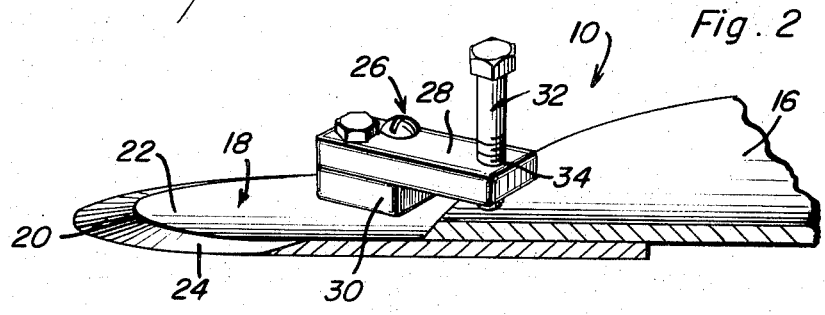
FIG. 2 is a fragmentary, sectional view taken generally along the line 2—2 of FIG. 1.
Figure 3:
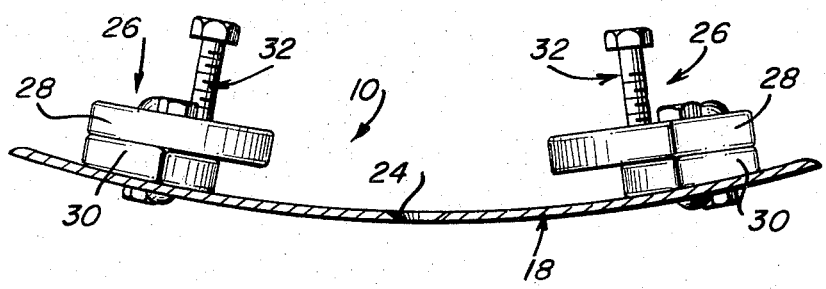
FIG. 3 is a sectional view, with the shovel removed, taken generally along the line 3—3 of FIG. 1.

FIGS. 1 to 3 of the drawings show a weed cutter attachment 10 selectively mountable on a conventional shovel 12 having a handle 14 and a round-headed shovel blade 16. As can be appreciated from FIGS. 1 and 2 of the drawings, shovel blade 16 is bowed in a plane transverse to the longitudinal extent of handle 14 so as to form a convex surface facing what is usually the upward surface of shovel.

Weed cutter attachment 10 has a body member 18 in the form of a bowed plate having spaced concave and convex surfaces. A cutting blade 20 having a bifurcated cutting surface formed on an edge of the plate forming body member 18 is provided on the latter for the purpose of cutting weeds, and the like. As can be readily seen from the drawings, the cutting surface is divided into the bifurcated parts 22. Each bifurcated part 22 of the cutting surface is arcuate in plan and cooperatively meets with the other part 22 to form a substantially V-shaped recess 24 partially bisecting the concave and convex surfaces of the plate along a line parallel to the longitudinal extent of handle 14.

Body member 18 is mounted on shovel blade 16 as by clamp members 26. Each clamp member 26, which may be considered as having an L-shape, is mounted on the concave surface of the plate forming body member 18, and has a one leg 28 arranged spaced from and parallel to the concave surface, and from the other clamp member 26, and another leg 30 attached to body member 18 as by the illustrated screw fasteners. A bolt 32 is arranged in a threaded bore 34 for selectively, retentively engaging shovel blade 16 and clamping attachment 10 onto the blade 16 in such a manner that the V-shaped recess 24 is arranged bisected by a line coaxial with the longitudinal extent of handle 14 and passing equidistant between the clamp members 26 and bisecting shovel blade 16.

To use an attachment 10, first loosen the setscrews or bolts 32 and place body member 18 on the extreme end of shovel blade 16 in the manner shown in FIGS. 1 and 2 of the drawings. Body member 18 should be pushed onto shovel blade 16 until legs 30 abut the edge of the blade. Now bolts 32 may be secured, as with a wrench, after the body member is properly positioned laterally of blade 16, and attachment 10 is clamped onto the shovel blade. When using attachment 10 according to the present invention, one merely skims the surface of the ground with the device. In this manner, cutting is easily accomplished right up and against fences, houses, and the like. Further, the thick, large size weeds are easily cut with a minimum of effort by the user. Thus, as can be readily appreciated from the above description and from the drawings, an attachment 10 according to the present invention provides an inexpensive, reliable, and easy-to-use cutting tool for numerous, every day cutting jobs.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A weed cutter attachment for a round-headed shovel blade, comprising, in combination:
   a. a body member;
   b. blade means provided on the body member for cutting vegetation, the blade means including a bifurcated cutting surface formed on an edge of the body member and divided into two parts, each bifurcated part of the cutting surface being arcuate in plan and cooperatively meeting with the other part to form a substantially V-shaped recess; and
   c. means mounted on the body member for attaching same to a round-headed shovel blade, the means for attaching including a pair of L-shaped clamp members, each clamp member mounted on a common surface of the body member and having a one leg arranged spaced from and parallel to the common surface, and spaced from the other clamp member, and means cooperating with the one leg for selectively, retentively engaging a round-headed shovel blade and clamping the attachment onto the shovel blade.

2. A structure as defined in claim 1, wherein the body member is a bowed plate having spaced concave and convex surfaces.

3. In combination with a shovel having a shovel blade, a weed cutter attachment, comprising, in combination:
   a. a body member;
   b. blade means provided on the body member for cutting vegetation, the blade means including a bifurcated cutting surface formed on an edge of the body member and divided into two parts, each bifurcated part of the cutting surface being arcuate in plan and cooperatively meeting with the other part to form a substantially V-shaped recess; and
   c. means provided on the blade means for attaching same to the shovel blade, the shovel blade being a round-headed shovel blade the means for attaching including a pair of L-shaped clamp members, each clamp member mounted on a common surface of the body member and having a one leg arranged spaced from and parallel to the common surface, and spaced from the other clamp member, and means cooperating with the one leg for selectively, retentively engaging the round-headed shovel blade and clamping the attachment onto the shovel blade.

4. A structure as defined in claim 3, wherein the body member is a bowed plate having spaced concave and convex surfaces.

5. A weed cutter attachment for a round-headed shovel blade, comprising, in combination:
   a. a body member, the body member being a bowed plate having spaced concave and convex surfaces;
   b. blade means provided on the body member for cutting vegetation, the blade means including a bifurcated cutting surface formed on an edge of the plate and divided into two parts, each bifurcated part of the cutting surface being arcuate in plan and cooperatively meeting with the other part to form a substantially V-shaped recess partially bisecting the concave and convex surfaces of the plate; and
   c. means mounted on the body member for attaching same to a round-headed shovel blade, the means for attaching including a pair of L-shaped clamp members, each clamp member mounted on the concave surface of the plate and having a one leg arranged spaced from and parallel to the concave surface, and spaced from the other clamp member, and means cooperating with the one leg for selectively, retentively engaging a round-headed shovel blade and clamping the attachment onto the shovel blade with the V-shaped recess of the cutting surface arranged bisected by a line passing equidistant between the clamp members and bisecting the shovel blade.

6. In combination with a shovel having a shovel blade, a weed cutter attachment, comprising, in combination:
   a. a body member;
   b. blade means provided on the body member for cutting weeds, the blade means including a bifurcated cutting surface formed on an edge of the body member and divided into two parts, each bifurcated part of the cutting surface being arcuate in plan and cooperatively meeting with the other part to form a substantially V-shaped recess partially bisecting the body member; and
   c. means provided on the blade means for attaching same to the shovel blade, the shovel blade being a round-headed shovel blade, the body member being a bowed plate having spaced concave and convex surfaces, and the means for attaching including a pair of L-shaped clamp members, each clamp member mounted on the concave surface of the plate and having a one leg arranged spaced from and parallel to the concave surface, and spaced from the other clamp member, and means cooperating with the one leg for selectively, retentively engaging the round-headed shovel blade and clamping the attachment onto the shovel blade with the V-shaped recess of the cutting surface arranged bisected by a line passing equidistant between the clamp members and bisecting the shovel blade.

* * * * *